Sept. 29, 1953 L. STASCHOVER ET AL 2,654,032
AUTOMATIC FREQUENCY CONTROL SYSTEM
Filed Sept. 23, 1948
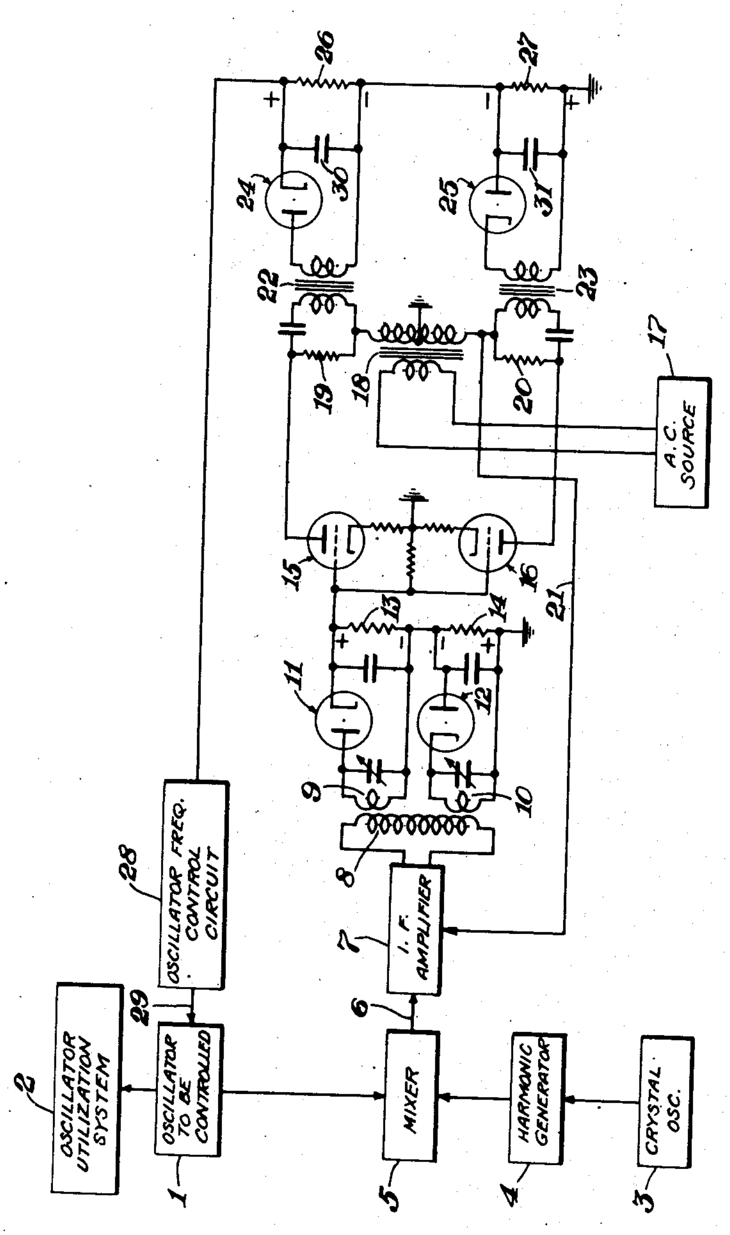
INVENTORS
LEO STASCHOVER
HEYWARD A. FRENCH
BY R. P. Morris
ATTORNEY Patented Sept. 29, 1953

2,654,032

UNITED STATES PATENT OFFICE 2,654,032

AUTOMATIC FREQUENCY CONTROL SYSTEM

Leo Staschover, New York, N. Y., and Heyward A. French, Belleville, N. J., assignors to International Standard Electric Corporation, New York, N. Y., a corporation of Delaware Application September 23, 1948, Serial No. 50,714

6 Claims. (Cl. 250—36)

The present invention relates to electrical communication systems and particularly to means for stabilizing the frequency of oscillators utilized in such systems.

In transmitters and receivers it is desirable that oscillators used therein operate at a frequency which varies little from a fixed value. To achieve this result various circuits have been proposed in which the oscillator to be controlled is adjusted under the influence of a wave derived from a very stable source and the output wave of the oscillator. These systems are generally quite complex and in many instances of slow response resulting in relatively wide frequency variations or in other ways lacking in efficiency.

It is an object of the present invention to describe an automatic frequency control system which operates in a more efficient manner than those of the prior art.

It is another object of the present invention to provide an automatic frequency control system by which oscillators may be controlled in frequency within narrower limits than the systems of the prior art.

The above mentioned and other features and objects of this system and the manner of obtaining them will become more apparent and the invention will be best understood by reference to the following description of an embodiment of the invention taken in conjunction with the accompanying drawings, wherein the single figure is a diagram illustrating the principles of the invention in a block schematic showing the means by which these principles may be applied to the automatic frequency control of well-known oscillator systems.

Referring to the figure an oscillator 1, the frequency of which is to be controlled within predetermined limits, is shown feeding an oscillator utilization system 2 which may comprise either transmission or reception equipment. A standard oscillator which may be of the crystal stabilized type 3, is shown feeding a harmonic generator 4 which may be included as well known to those expert in the art. Both oscillator 1 and the frequency multiplied output of oscillator 3 are fed to a common mixer 5, which may be of any well known type. One will then obtain on the output line 6, the products of the mixer 5 which will consist of the sum and difference of the frequencies passed to mixer 5. One of these two frequencies is selected and amplified by intermediate frequency amplifier 7 and passed to an output coupling 8. A balanced off-resonant discriminator is shown coupled to coupling 8. This off-resonant discriminator consists of two resonant circuits 9 and 10, these two resonant circuits being tuned equally above and below respectively the frequency to which intermediate frequency amplifier 7 is tuned. The outputs of the two resonant circuits 9 and 10 are passed to two diodes 11 and 12 connected in opposite polarity in such a way that the respective load resistors 13 and 14 receive oppositely poled direct current voltages. The output of this off-resonant discriminator is passed to an amplifier which comprises tubes 15 and 16. An alternating current source 17 is shown feeding the anodes of tubes 15 and 16 in push-pull while the output of the off-resonant discriminator feeds the control grid of tubes 15 and 16, in parallel. The anode feed of tubes 15 and 16 is accomplished by means of transformer 18 and the load resistors 19 and 20. The A. C. source 17 may be of any desired frequency and in the preferred embodiment may be the power line frequency at the installation of the equipment. A portion of the alternating current voltage present on the secondary of transformer 18 is passed by line 21 to the intermediate frequency amplifier where it is connected in such a manner as to modulate in amplitude the output of the intermediate frequency amplifier 7. This connection 21 may be made to any point in the intermediate frequency amplifier at which the amplifier may be modulated. As is well known such amplifiers may be modulated by the control grid, suppressor grid, screen grid or at other well known points.

A pair of transformers 22 and 23 are shown connected across the load resistors 19 and 20 of tubes 15 and 16. The secondaries of these transformers 22 and 23 are shown connected to diodes 24 and 25 which are connected in opposite polarity so that the output voltages appearing across resistors 26 and 27 shall be in opposite polarity. The voltage obtained across resistors 26 and 27 is then passed to an oscillator frequency control circuit 28, which may be for example a reactance tube, servo system, or other well-known oscillator frequency control circuit. The output of the oscillator frequency control circuit 28 is then passed by line 29 to an appropriate portion of oscillator 1.

The operation of the system shown in the figure may be described as follows:

The frequency of oscillator 1 is compared against a standard frequency obtained from oscillator 3 and harmonic generator 4 in a mixer 5. One of the frequencies obtained at the output of mixer 5 on connection 6 is amplified by an intermediate frequency amplifier 7 the output of which is amplitude modulated by an A. C. source 17. The output of the intermediate frequency amplifier 7 appears across a coupling coil 8 and is passed to a discriminator comprising diodes 11 and 12 and load resistors 13 and 14. Across these load resistors appears a voltage which is of a polarity indicative of the direction of frequency deviation of oscillator 1 and is further modulated in amplitude. This voltage is then passed in parallel to the grids of amplifiers 15 and 16 while the A. C. voltage from source 17 is passed to the anodes of these tubes in push-pull. Since the discriminated voltage passed to the grids of tubes 15 and 16 will consist of amplitude modulated pulses of a given polarity dependent on the oscillator frequency, and since the tubes 15 and 16 will conduct alternately due to their push-pull anode excitation, one of the tubes 15 or 16 will draw heavier plate current than the other due to the fact that a voltage pulse appears at its grid at the same time that a voltage pulse is applied to its plate. This heavier current in one of these tubes will result in a greater voltage pulse being applied to one of the rectifiers 24 or 25 depending on which of the tubes is conducting. The condensers 30 and 31 across resistors 26 and 27 are arranged to provide an integration of the voltages pulses applied to the diodes 24 and 25. The values of these condensers and their associated resistors are chosen in such a way that the time constant of the parallel resistance-capacitance combination is long with respect to a period of the A. C. source 17. Thus since rectifiers 24 and 25 are connected in opposite polarity it is clear that a polar voltage will be developed across resistors 26 and 27 depending upon the direction of frequency deviation of the oscillator 1. The voltage developed across resistors 26 and 27 will consist of a steady direct current electromotive force due to the integrating action of condensers 30 and 31. The voltage may be then passed to an oscillator frequency control circuit 28 and may be used to control the frequency of oscillator 1 by means of connection 29 which may be either an electrical or mechanical connection.

While I have described above the principles of my invention in connection with specific apparatus it is to be clearly understood that this description is made only by way of example and not as a limitation to the scope of my invention.

What is claimed is:

1. In an automatic frequency control system for an oscillation generator having a frequency controlling means, the combination of a frequency discriminator, a periodic voltage source, means connected to said source for amplitude modulating oscillations derived from the generator with said periodic voltage and applying the modulated oscillations to said discriminator, a phase-amplitude detecting means coupled to said source of periodic voltage and to the output of said discriminator for deriving a control voltage having a polarity determined by the phase of the output voltage of said discriminator relative to said periodic voltage, and means for applying said control voltage to the frequency controlling means of the oscillation generator.

2. A system as recited in claim 1 wherein said discriminator includes a pair of resonant circuits tuned on opposite sides of the frequency of the oscillations derived from said generator and diodes connected to said resonant circuits in opposed polarity whereby the output of the discriminator possesses an algebraic sign indicative of the direction of the frequency deviation at said discriminator.

3. A system as recited in claim 2 wherein the phase amplitude detecting means comprises a pair of electron tubes each including an anode, cathode and grid, and means for modulating the anodes in push-pull at the same frequency and in the same phase as the modulation of said oscillations, said discriminator outputs being supplied in parallel to the grids of said tubes.

4. A system as recited in claim 3 wherein the anode circuits of said pair of tubes are provided with means for coupling energy into a second pair of oppositely connected diodes, the loads of said second pair of diodes being connected in series and the voltage appearing thereacross being applied to said frequency controlling means.

5. A system as recited in claim 4 wherein the loads of said second pair of diodes comprise parallel connected resistances and capacitances, the time constant of said loads being long compared to a period of said periodic voltage.

6. A system as recited in claim 5 wherein the anodes of said pair of tubes are modulated in push-pull by means of a transformer connected to said source of periodic voltage, the secondary of said transformer being symmetrically connected to said anodes through resistances across which are connected said means for coupling energy to said second pair of diodes.

LEO STASCHOVER.
HEYWARD A. FRENCH.

References Cited in the file of this patent

UNITED STATES PATENTS

| Number | Name | Date |
|---|---|---|
| 2,065,565 | Crosby | Dec. 29, 1936 |
| 2,173,301 | Kinross | Sept. 19, 1939 |
| 2,377,326 | Crosby | June 5, 1945 |
| 2,377,327 | Seeley | June 5, 1945 |
| 2,379,689 | Crosby | July 3, 1945 |
| 2,445,409 | Shank | July 20, 1948 |